(12) United States Patent
Hershey et al.

(10) Patent No.: US 9,477,895 B2
(45) Date of Patent: Oct. 25, 2016

(54) METHOD AND SYSTEM FOR DETECTING EVENTS IN AN ACOUSTIC SIGNAL SUBJECT TO CYCLO-STATIONARY NOISE

(71) Applicant: Mitsubishi Electric Research Laboratories, Inc., Cambridge, MA (US)

(72) Inventors: John R. Hershey, Winchester, MA (US); Vamsi K. Potluru, Albuquerque, NM (US); Jonathan Le Roux, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 209 days.

(21) Appl. No.: 14/230,711

(22) Filed: Mar. 31, 2014

(65) Prior Publication Data

US 2015/0281838 A1    Oct. 1, 2015

(51) Int. Cl.
*H04R 29/00* (2006.01)
*G06K 9/00* (2006.01)
*G06K 9/62* (2006.01)

(52) U.S. Cl.
CPC ....... *G06K 9/00973* (2013.01); *G06K 9/00563* (2013.01); *G06K 9/6277* (2013.01); *G06K 9/6292* (2013.01)

(58) Field of Classification Search
CPC ... G01L 23/22; G01L 23/221; G01L 23/223; F02D 35/00; F02D 35/027; G10K 2210/128; G10K 2210/1282; G10K 2210/3038; G10K 2210/3035; G10K 2210/30351; H04R 1/22; H04R 25/507; H04R 29/00; H04R 29/004; G06K 9/00973; G06K 9/00563; G06K 9/6277; G06K 9/6292

USPC ........ 381/71.4, 71.12, 71.14, 71.3, 71.9, 56, 381/58, 86; 73/114.01, 114.02, 114.03, 73/35.01, 35.03, 35.04, 35.07, 35.12
See application file for complete search history.

(56) References Cited

U.S. PATENT DOCUMENTS

| | | | |
|---|---|---|---|
| 5,483,936 A * | 1/1996 | Kerstein | G01L 23/225 123/406.16 |
| 6,750,798 B2 * | 6/2004 | Honda | H03H 17/0211 123/406.34 |
| 6,862,517 B2 * | 3/2005 | Galtier | G01L 23/225 123/406.16 |
| 8,474,308 B2 | 7/2013 | Sgatti et al. | |
| 8,639,502 B1 * | 1/2014 | Boucheron | G10L 21/02 381/94.1 |
| 8,805,697 B2 * | 8/2014 | Visser | G10L 25/48 381/23 |
| 2002/0097882 A1 * | 7/2002 | Greenberg | H04R 29/00 381/56 |
| 2004/0003651 A1 * | 1/2004 | Rauchfuss | G01L 23/225 73/35.07 |
| 2010/0106393 A1 * | 4/2010 | Sgatti | G01L 23/221 701/111 |
| 2015/0114088 A1 * | 4/2015 | Fischer | G01L 23/221 73/35.01 |

* cited by examiner

*Primary Examiner* — Vivian Chin
*Assistant Examiner* — Jason R Kurr
(74) *Attorney, Agent, or Firm* — Gene Vinokur; James McAleenan; Hironori Tsukamoto

(57) ABSTRACT

A method detects events in an accoustic signal subject to cyclostationary background noise by first segmenting the signal into cycles. Features with a fixed dimension are derived from the cycles, such that the timing of the features is relative to a cycle time. The features are normalized using an estimate of the cyclostationary background noise. Then, after the normalizing, a classifier is applied to the features to detect the events.

19 Claims, 5 Drawing Sheets

METHOD AND SYSTEM FOR DETECTING EVENTS IN AN ACOUSTIC SIGNAL SUBJECT TO CYCLO-STATIONARY NOISE

FIELD OF THE INVENTION

The invention relates generally to detecting typically low-energy and relatively rare acoustic events, and more particularly to detecting the events in an accoustic signal subject to cyclo-stationary background noise.

BACKGROUND OF THE INVENTION

Anomalities in mechanisms can sometimes be characterized by their accoustic signatures or events. The accoustic events are typically rare, and overwhelmed by background noise. Situations in which this background noise is cyclo-stationary are common, e.g., with rotating mechanisms, where the background noise signal is not periodic, but its statistical properties are periodic.

Detecting relatively rare and typically low-energy events in such background noise can lead to useful applications, but is challenging. One such application is that of vehicle engine knock detection. When an engine rotates at a high speed, and depending on running and environmental conditions, uncontrolled explosions can occur at certain cycles, which can lead to potential damage to the engine.

However, sometimes the most fuel efficient operating point corresponds to conditions in which knocks occur, and therefore engine manufacturers typically try to control their engine such that they run in conditions as close as possible to knocking conditions, but without creating significant knocks.

Knock detection sensors and devices are required to control the running conditions of engines. The sensors are typically accelerometers. The detection devices, e.g., engine control units, generally tend to rely on simple filtering and thresholding techniques, and their accuracy is limited. Those devices and sensors are typically tuned by an expert who detect knocks by listening to the engine and calibrate the sensors so that: their location as well as their detection thresholds are set such that the detections match those of the expert. The expert can use various sensors processed through some signal processing methods as side information, e.g., cylinder pressure, ion current, etc. Such calibration is highly time-consuming, error-prone, tiring, and requires a highly skilled expert. It would be useful to have a method of replacing or assisting an expert to automatically tune the control unit and sensor.

SUMMARY OF THE INVENTION

The embodiments of the invention provide a method and system for detecting events in an accoustic signal subject to cyclo-stationary noise. The invention solves the problem of intermittent event detection in noisy signals. This can be challenging due to the presence of noise, and the difficulty of obtaining precise labels of the events. Of special interest is the case where the noise results from a repetitive mechanism, and hence the noise can be characterized as cyclo-stationary.

The cyclo-stationarity can be exploited by signal processing methods to produce features that accentuate deviations from the background noise. To detect the events, a classifier or pattern recognizer is trained on features for which labels are available. However, in some applications, only labels at the level of whole segments of signal containing many cycles are available. Nevertheless, some applications require detection of the precise timing of the events. In this case, a multiple instance learning objective function can be optimized to produce a classifier for individual cycles.

The method segments the input acoustic signal into cycles, and then derives features with a fixed dimension from regions distributed within the cycles, such that the timing of the features is relative to the cycle time rather than an absolute time, and a placement of the regions is a function of a length of each cycle. A number of the regions is fixed for all the cycles. The features are normalized using an estimate of the cyclo-stationary background noise. Optionally, using a model-based noise suppression method, the features can be enhanced. The model-based suppression method can use non-negative matrix factorization, neural networks, or Gaussian mixture models. Then, pattern recognition is applied to the features to detect the events.

Parameters of the pattern recognition are trained on some labeled training data. In some cases, this can be challenging, because of the lack of precise labels. In such cases, multiple instance learning is used.

DETAILED DESCRIPTION OF THE PREFERRED EMBODIMENTS

Figure 1:
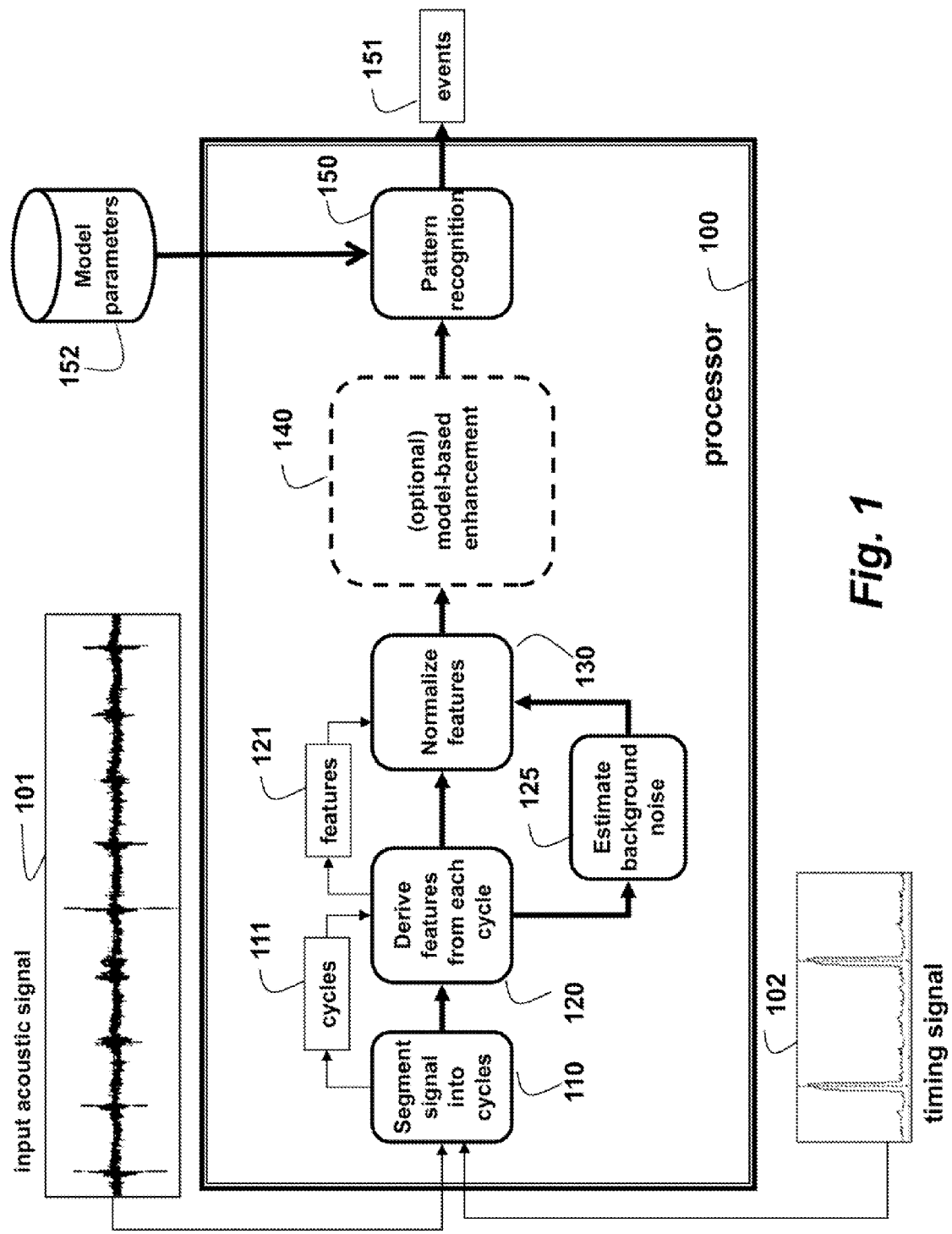
FIG. 1 is a block diagram of a method and system for detecting events in a signal subject to cyclo-stationary noise according to embodiments of the invention.

As shown in FIG. 1, the embodiments of the invention provide a method and system for detecting events in an accoustic signal 101 subject to cyclo-stationary noise. For example, the signal is acquired from a running engine or machine with an air microphone.

As shown in FIG. 1, the embodiments of our invention provide a method and system for detecting, in the acoustic signal 101, events subject to cyclo-stationary noise. First, the signal is segmented 110 into cycles 111. A timing signal 102 can be used as side information for the segmenting. For each cycle, features 121 are derived 120 from regions distributed within the cycles. For example, the features can be obtained from spectrograms.

The features have fixed dimension, such that the timing of the features is relative to the cycle time rather than an absolute time. Background noise is also estimated 125. Then, the features are normalized 130 using the estimate of the cyclo-stationary background noise. Optionally, the features can be enhanced 140 using a model-based noise suppression procedure. The model-based suppression procedure can use non-negative matrix factorization, neural networks, or Gaussian mixture models. Lastly, during testing, the events 151 are detected using model parameters 152 and a classifier or pattern recognizer 150.

The steps of the method can be performed in a processor 100 connected to memory and input/output interfaces by buses as known in the art. The signal 101 can be in the form of time series data including a cyclic pattern of background noise, as well as intermittent events. The cycle intervals are roughly the same length of time, which can be easily determined for a particular machine or engine, or otherwise obtained from the timing signal 102, e.g., a spark signal in an internal combustion signal. We assume here that each single event is located within one cycle so that the event does not affect the signal outside the cycle.

Signal Processing

Tune-Frequency Analysis Robust to Cycle Length

Figure 2:
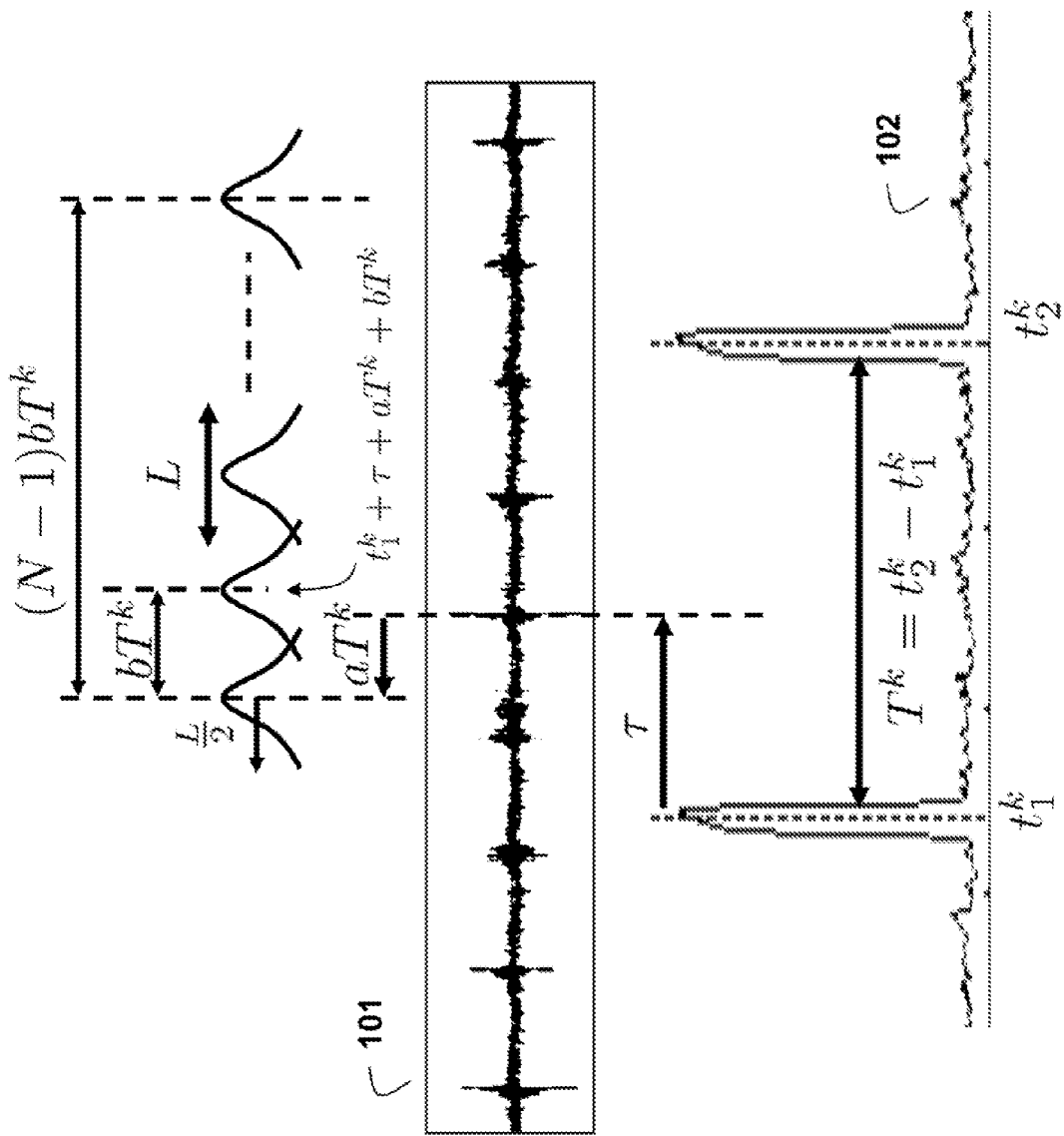
FIG. 2 is a timing diagram of window placement in cycles according to embodiments of the invention.

As shown in FIG. 2, we use the timing signal 102 to determine a placement of a set of windows in each cycle with respect to the input acoustic signal 101, where τ is an offset, a is an offset ratio, b is a shift ratio, N is a number of windows per cycle, L is a window length, $l_1^k$ and $l_2^k$ are the start and end times of the k-th cycle obtained from the timing signal, and $T^k$ the length of that cycle. A potential role for the offset τ is to synchronize the start and end times obtained from the timing signal with what is considered to be the start and end time of a cycle in the input acoustic signal. The offset ratio a can be used to shift the focus of the set of windows relatively to the cycle. The number N of windows for each cycle is fixed, while the use of a shift ratio b allows us to vary the spacing between windows to account for variations in the cycle length. This is important in order to apply a conventional classification algorithm, because the features for such classification algorithms need to have the same size for all samples, which are here the cycles.

In the case of engine knock detection, the timing signal can be a spark signal obtained directly from the distributor. The start and end time of a cycle in the input acoustic signal can be considered to be the timing of one of the cylinders reaching the position known as top-dead center (TDC), further offset by the time it takes for the sound to travel in the air from the engine to the microphone with which the input acoustic signal is recorded. The offset r can thus be computed so as to modify the spark times, obtained from peaks in the spark signal, by accounting for the relative timing of the spark with respect to TDC, which is represented by a spark advance angle in degrees, as well as for a difference in time required to acquire the timing signal and the acoustic signal, which depends on the distance to the microphone. If one denotes by a [deg] the spark advance angle (e.g., +12 indicates that the spark occurs 12 degrees before TDC), by RPM [rotation per minute] the rotation speed (note that by one rotation we here mean 360°, while a "cycle" in a 4-stroke engine corresponds to 720°), d [m] the distance to the microphone (d=0 for accelerometers), and c [m/s] the speed of sound, we can compute the offset τ to apply to the cycle start and end times to align them with the microphone signal according to:

$$\tau = \frac{a}{6 \cdot RPM} + \frac{d}{c}.$$

Figure 3:
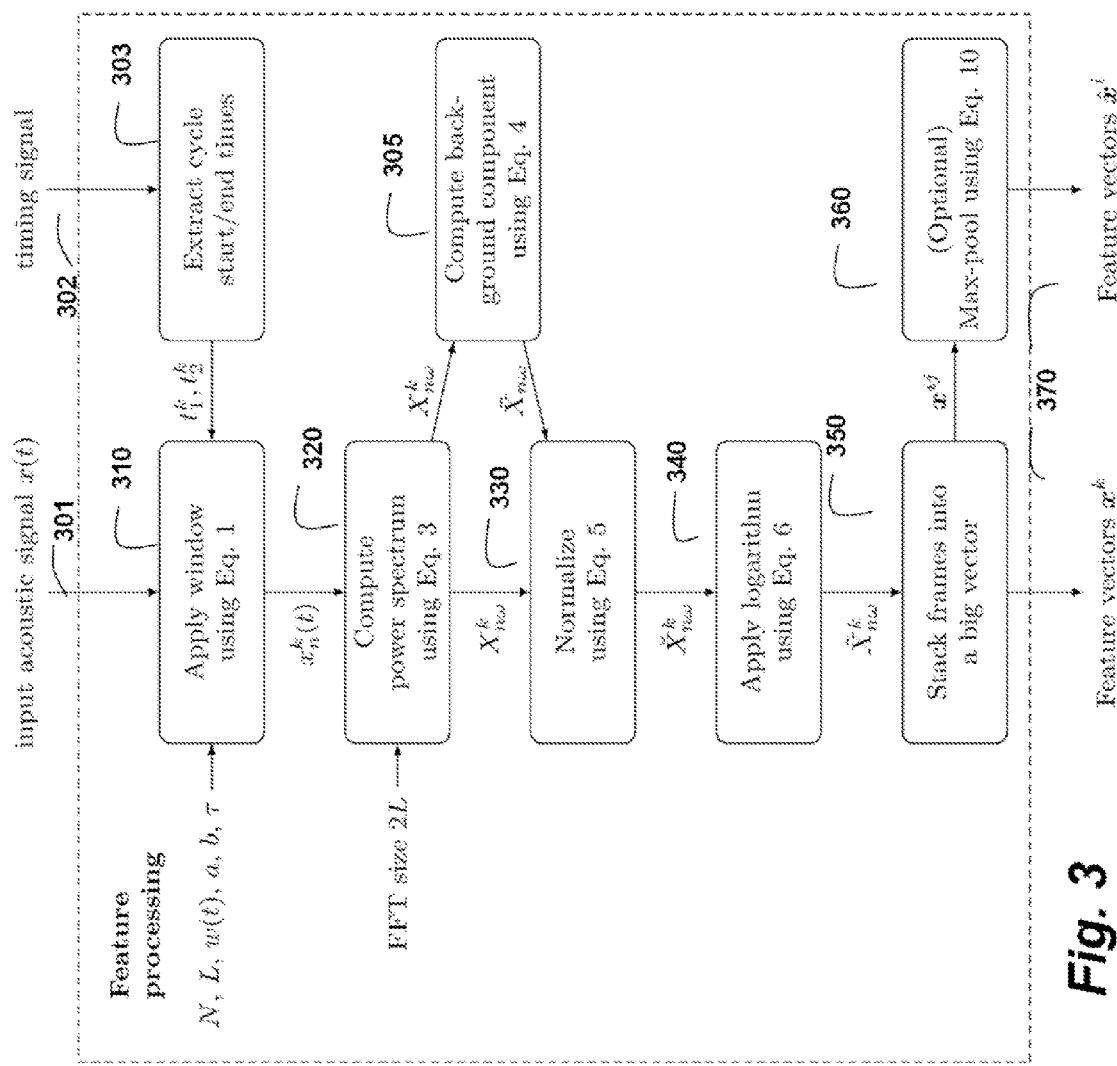
FIG. 3 is a flow diagram of feature processing according to embodiments of the invention.

FIG. 3 shows the details of the feature processing. Input is an acoustic signal 301, and a timing signal 302. For example, for detecting engine knock, the timing signal can be a spark signal. The timing signal is used to extract 303 the start and end times of the cycles.

We denote by x(t) the acoustic signal 301. A time-frequency representation of x(t) in each cycle is obtained by applying the set of windows described above to x(t) to obtain a set of frames for each cycle, and taking the discrete Fourier transform of each frame, for example using the fast Fourier transform algorithm.

If an analysis window of length L is denoted as w, then the n-th frame of the k-th cycle is obtained 310 as $$x_n^k(t) = w(t) \cdot x\left(l_1^k + \tau + aT^k - \frac{L}{2} + (n-1)bT^k + t + 1\right), \quad (1)$$
$$t = 0, \ldots, L-1.$$

In particular, one can use a sine window (square root of the Hann window) for analysis:

$$w(t) = \sqrt{\frac{1}{2} - \frac{1}{2}\cos\left(\frac{2\pi(t+1)}{L}\right)}, t = 0, \ldots, L-1. \quad (2)$$

Then, the power spectra are determined 320 by taking, for example, the Fourier transform with the window size or double the window size as the Fourier transform size. The power spectrum of the n-th frame of the k-th cycle is $$X_{n\omega}^k = \left|\sum_{t=0}^{L-1} x_n(t) e^{-i2\pi \omega \frac{t}{2L}}\right|^2, \omega = 0, \ldots, L. \quad (3)$$

Note that one only needs to keep the "non-negative" frequencies, i.e., from DC to the Nyquist frequency, or ω=0, ..., L, because the "negative" frequencies, i.e., above Nyquist frequency or ω=L+1, ..., 2 L−1, are redundant.

The power spectra for the frames of a cycle are concatenated in the time dimension to obtain a spectrogram-like representation for the complete cycle.

Filtering

We use a filtering technique to remove the cyclo-stationary component from the signal. To do this we compute 305 the background noise as follows. The general idea is to determine some average $\overline{X}$ over all cycles and to use the average to normalize features in each cycle. The simplest example of such an average is the mean for all cycles independently for each time-frequency bin:

$$\overline{X}_{n\omega} = \frac{1}{K}\sum_{k=1}^{K} X_{n\omega}^k. \quad (4)$$

It is understood that other formulations can be used to compute the average.

We can then normalize 330 each cycle as follows:

$$\tilde{X}_{n\omega}^k = \frac{X_{n\omega}^k}{\overline{X}_{n\omega}}, \forall k, n, \omega. \quad (5)$$

If the number of cycles where an event occurs is small compared to the total number of cycles K, then the mean is likely to be a good estimator of the cyclo-stationary component. In the other extreme, if the number of cycles where events occur is large, then we can use more robust estimators, such as the median.

Finally, we apply 340 a logarithm to improve the dynamic range:

$$\tilde{X}_{n\omega}^k = \log \tilde{X}_{n\omega}^k, \forall k, n, \omega. \quad (6)$$

We stack 350 frames into a large vector, and optionally use 360 a max-pool, described below, to obtain feature vectors 370.

Classification

The features can be fed to a classifier to learn the model parameters. However, our task is complicated by the fact that we may not have access to precise labels or if we do, it may only be for a small number of samples. To overcome this issue, we can consider the multiple instance framework from machine learning in which multiple samples are combined into a "bag" with a corresponding label. A positive bag is one which has one or more positive instances and a negative bag is one in which all instances are negative.

Before we describe the multiple instance framework, we briefly review the case where labels are available for all training samples. We can use logistic regression (LR) as the classifier here, as an example, but other classifiers could be used.

Learning with Labels for Each Sample
Logistic Regression (LR) Model

Let $\{(x^1, y_1), \ldots, (x^m, y_m)\}$ be a set of training samples, where $x^j$ is a feature vector and $y_i$ a corresponding label. In our context, $x^i$ is a vectorized version of $(\tilde{X}_{n\omega}^i)_{n=1,\ldots,N;\omega=0,\ldots,L}$ defined in Eq. 6, obtained, for example, by stacking 350 all frames $(\tilde{X}_n^i)_{n=1,\ldots,N}$ into a single vector.

Under the logistic regression model with parameters $$\theta = \begin{bmatrix} W \\ b \end{bmatrix},$$

the probability that feature vector $x_i$ corresponds to a positive sample is modeled as:

$$p(y=1 \mid x^i, \theta) = p_i = \frac{1}{1 + e^{-\theta^T \tilde{x}^i}}, \quad (7)$$

where $$\tilde{x}^i = \begin{bmatrix} x^i \\ 1 \end{bmatrix}$$

extends the feature vector to include a bias term, and the probability that the feature vector corresponds to a negative sample as:

$$p(y=0 \mid x^i, \theta) = q_i = \frac{1}{1 + e^{\theta^T \tilde{x}^i}} = 1 - p_i. \quad (8)$$

The model parameters 152 are trained so as to maximize the likelihood of the training data under the model, which amounts to minimizing the negative log-likelihood objective function $\phi^{LR}(\theta)$ defined as $$\phi^{LR}(\theta) - \sum_i [\alpha_+ y_i \log(p_i) + \alpha_-(1 - y_i)\log(1 - p_i)] + \beta_W \|W\| + \beta_b \|b\|, \quad (9)$$

where $\alpha_+$, $\alpha_-$, $\beta_W$ and $\beta_b$ are weights. The last two terms correspond to a regularization of the parameters and usually involve either the $L_1$ or $L_2$ norm of W and/or b, corresponding to prior probabilities of sparseness and smoothness respectively. A conventional setting for $\alpha_+$ and $\alpha_-$ is $\alpha_+ = N_+$ and $\alpha_- = N_-$, where $N_+$ and $N_-$ are the number of positive and negative training samples, respectively. Typically, $\beta_b$ is set to 0, meaning that the bias term is not regularized: the main goal of regularization is to avoid a particular feature taking too much importance on the training data, leading to overfitting, but there is no such concern for the bias term.

After the parameters θ have been trained, they can be used to give posterior probabilities on test data. using Eqs. 7 and 8.

Figure 4:
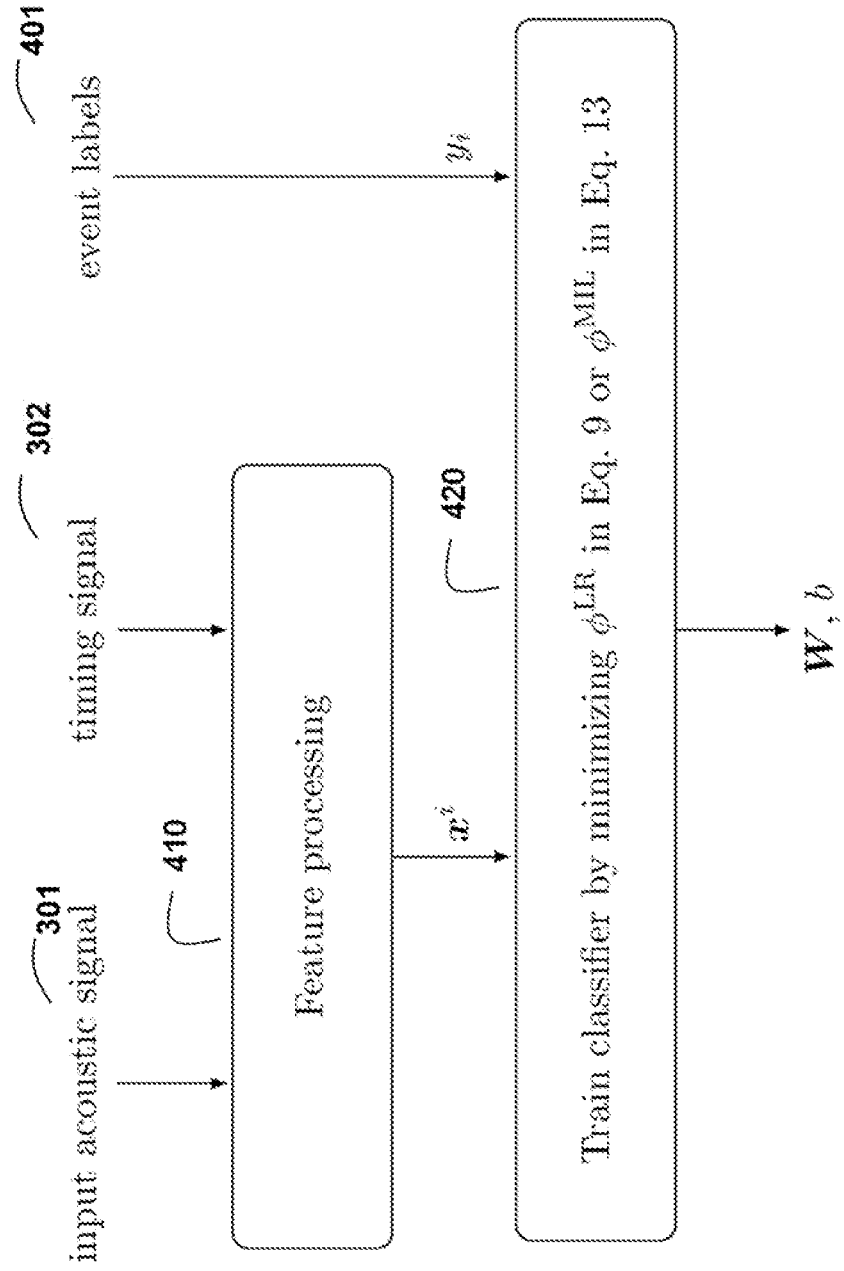
FIG. 4 is a flow diagram of training according to embodiments of the invention.

FIG. 4 shows the training procedure, which takes as input the acoustic signal 301, the timing signal 302, and event labels 401. Features are processed 410 as described, above, and the classifier is trained. 420 by learning the model parameters 152 using Eqn. (9).

Figure 5:
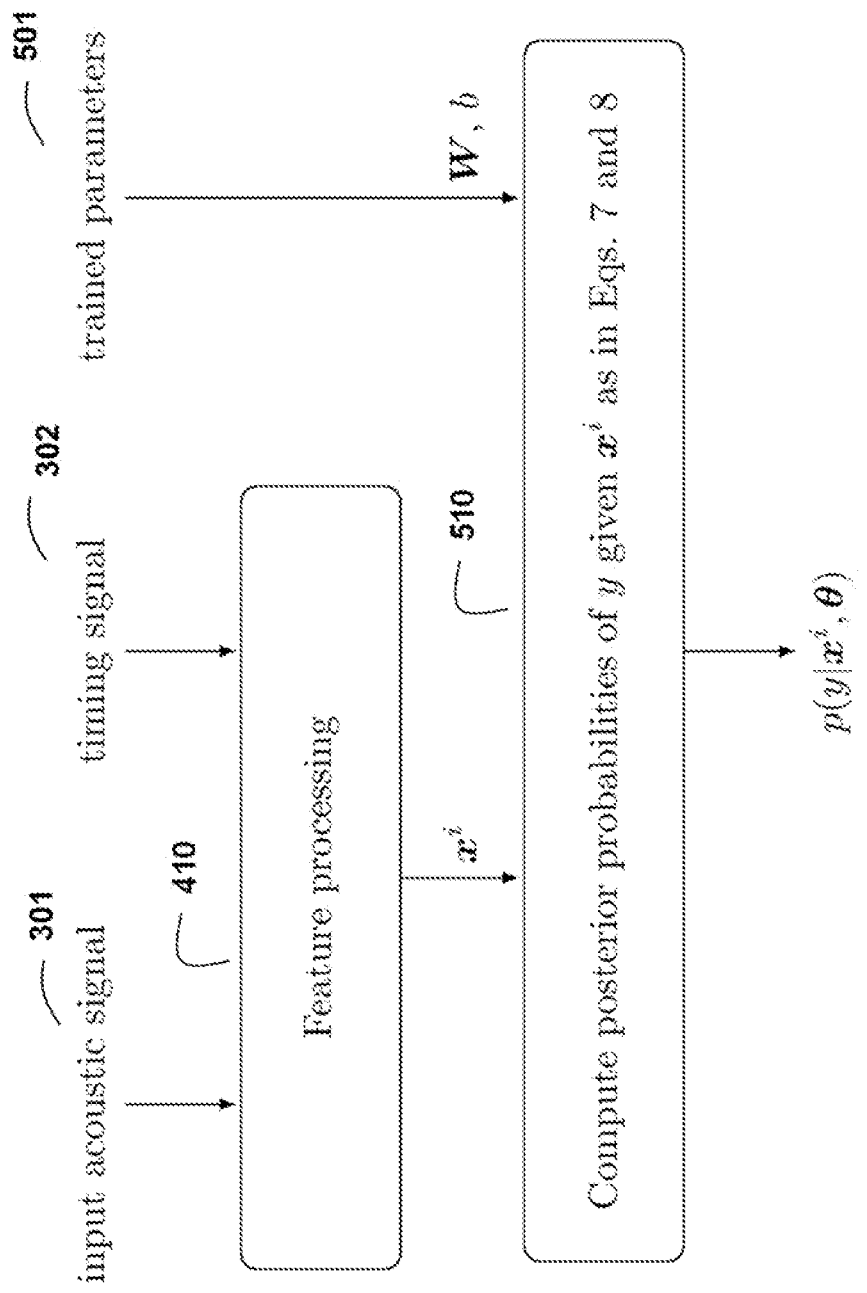
FIG. 5 is a flow diagram of testing according to embodiments of the invention.

FIG. 5 shows how signals are tested. Inputs are the acoustic signal, the timing signal, and model parameters 591. Features are processed, as before, and the posterior probabilities $p(y|x^i,\theta)$ are computed 510 using Eqs (7) and (8). The training and testing steps can be performed in a processor.

Multiple Instance Learning (MIL)

In an multiple instance learning framework, the label information is only available at the level of a "bag" of multiple instances, instead of each single instance or sample. When a bag of samples is given a negative label, it means that all the instances in the bag are negative. However, if a bag is given a positive label, it means that at least one (but maybe more) samples in the bag are positive.

This type of situation typically occurs when an expert labels some data acquired over a large time interval, and determines whether there was, or not, at least one event in, say, each minute of data, without giving further precision as to where that or those event(s) actually occurred within the minute.

There are several ways of dealing with such a situation. The first is to perform both training and testing at the level of bags of samples, in effect falling back onto a situation where a label is given for each "training sample," a training sample now corresponding to a bag as a whole: in that case, no prediction can be made at the level of a single cycle, only at the level of a bag of cycles.

An example of such a method consists in "pooling" the features in a bag to obtain a feature vector similar to that of as single sample (here, a cycle), and to use the classical framework exemplified above with logistic regression. This is described below.

A second way, which enables detection of events at: the cycle level, is to train a classifier that performs classification at the level of a single instance by changing the objective function so that only information at the bag level is used. This is also described below.

Bag-Level Classification with Max Pooling

Let $\{(B_1,y_1), (B_2,y_2), \ldots, (B_m,y_m)\}$ denote a set of bags and their corresponding labels, where $B_i = [x^{i1}, x^{i2}, \ldots, x^{in_i}]$, $x^{ij}$ is the j-th feature vector, the feature vector of the j-th cycle, of the i-th bag, and $n_i$ is the size of the i-th bag.

We can circumvent the lack of label information at the instance level by summarizing the instances of a bag into a single sample. These summarized features along with the bag level labels enable us to apply conventional supervised learning methods. One way to summarize the instances in a bag is to "pool" the features of all elements in the bag, for example using the maximum, which results in a so-called max-pooling procedure 360. The feature vector for bag $B_i$ is defined as:

$$\hat{x}_l^i = \max_{j=1,\ldots,n_i} \{x_l^{ij}\}, \forall l, \qquad (10)$$

where l is an index that here corresponds to a pair (n,ω) in the vectorized form of $\tilde{x}_{n\omega}^{ij}$. By using $\{(\hat{x}^1, y_1), \ldots, (\hat{x}^m, y_m)\}$ as the training data, we can apply a conventional classical logistic regression framework as described above.

However, a disadvantage of this approach is that we have a trained a model at the bag level, and there is no guarantee that it will perform well at the instance level: in other words, the classifier is trained to classify feature vectors $\hat{x}^i$ that are "max-pooled" for elements in a bag $B_i$, and may not perform well on one of the non-pooled feature vectors $x^{ij}$.

Instance-Level Classifier

We now describe a model that works well at the instance and at the bag level, Such a model, is the most useful in practice because the model only requires bag-level labels, while still be able to perform instance-level classification.

We can adapt the logistic regression model to the multiple instance framework. As described above, in a negative bag, have all elements are negative, and the probability for a bag $B_i$ to be negative under the logistic regression model with parameter θ is:

$$p(y=0 \mid B_i, \theta) = q_{B_i} = \prod_{j=1}^{n_i} p(y_{i,j} = 0 \mid x^{ij}, \theta) = \prod_{j=1}^{n_i} q_{ij}, \qquad (11)$$

where $p(y_{ij}=0 \mid x^{ij}, \theta)$ is defined similarly as in Eq. 8.

On the other hand, a positive bag only needs to have at least one positive element to be positive. This is not easily written in terms of probabilities on the elements of the bags, and we simply express the probability for a bag to be positive as that not to be negative:

$$p(y=1 \mid B_i, \theta) = p_{B_i} = 1 - \prod_{j=1}^{n_i} p(y_{i,j} = 0 \mid x^{ij}, \theta) = 1 - \prod_{j=1}^{n_i} q_{ij}, \qquad (12)$$

Similarly to conventional logistic, regression case, the parameters of the model can be trained by minimizing the negative log-likelihood objective function $\phi^{MIL}(\theta)$:

$$\phi^{MIL}(\theta) = -\sum_i \left[\alpha_+ y_i \log\left(1 - \prod_{j=1}^{n_i} q_{ij}\right) + \alpha_-(1-y_i)\sum_{j=1}^{n_i} \log(q_{ij})\right] + \qquad (13)$$

$$\beta_W \|W\| + \beta_b \|b\|.$$

A major difficulty with the above objective function is the presence, inside the logarithm, of a product of potentially many terms that can be either very small or very close to 1.

Combined Model

The instance-level model can be combined with the bag-level model. The idea is that when a bag contains a large number of positive instances, it is better summarized by bag-level features, while instance-level features are preferred when the number of positive instances is low. A weighted model, which combines the two approaches is learnt, and the weight parameters are adaptively tuned to the data set.

Optimization of the Instance-Level Classifier

Unlike the logistic regression model, the MIL framework described above leads to a non-convex formulation. The gradient: for a positive bag can be obtained as:

$$\text{Gradient positive bag} = \frac{\prod_{k=1}^{n_i} q_{ik}}{1 - \prod_{k=1}^{n_i} q_{ik}} \begin{bmatrix} B_i p_i \\ 1^T p_i \end{bmatrix} \qquad (14)$$

where $p_i = [p_{i1}, p_{i2}, \ldots, p_{im_i}]$ is the vector of probabilities for the instances in bag i being positive, $q_{ik} = 1 - p_{ik}$ and I is a vector of all ones. The gradient for a negative bag is the same as in the case of logistic regression and is as follows:

$$\text{Gradient negative bag} = \sum_k q_{ik} \tilde{x}_{ik} \exp(\theta^T \tilde{x}_i). \qquad (15)$$

Instead of computing the Hessian H, we provide a matrix-free version of the Hessian vector product computation. That is, given some vector v, one can efficiently compute the matrix vector product Hv, as follows:

$$Hv = \sum_{k=1}^{n_i} q_{ik} p_{ik} (v^T \tilde{x}_i) \tilde{x}_i - p_i \frac{\tilde{x}_{ik} v^T \left(\sum_j \tilde{x}_i p_{ij}\right)}{1 - \Pi_k q_{ik}}. \qquad (16)$$

The gradient combined with the Hessian can be input to conventional optimization procedures, as Newton conjugate gradient, to minimize the MIL objective, Because the problem is non-convex we can only expect local convergence and good initializers are key to finding meaningful solutions.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting events in a signal subject to cyclostationary background noise, wherein the signal is an acoustic signal, the method comprising:
   segmenting the signal into cycles;
   determining within each cycle a sequence of regions, wherein a number of regions in the sequence is a fixed number for the cycles, and a placement within the cycle of each region in the sequence is a function of a length of the cycle;
   deriving region features with a fixed dimension from each region within the sequence of regions for each cycle for the cycles;

deriving cycle features for each cycle by concatenating the region features for the regions within the sequence of regions for the cycle;

calculating an average of the cycle features over the cycles for obtaining an estimate of the cyclostationary background noise;

normalizing the cycle features for each cycle using the estimate of the cyclostationary background noise; and applying, after the normalizing, a classifier to the cycle features to detect the events, and using the detected events to tune a control unit of a machine, wherein the steps are performed in a processor.

2. The method of claim 1, further comprising acquiring, using an air microphone, the signal from a running engine or machine.

3. The method of claim 2, wherein the segmenting is according to a timing signal, the timing signal is used to extract start and end times of the cycles, and the timing signal assists in detecting engine knock.

4. The method of claim 3, wherein the timing signal is a spark signal.

5. The method of claim 2, wherein the events are engine knocks.

6. The method of claim 1, further comprising:
enhancing the features using a model-based cyclo-stationary noise suppression method.

7. The method of claim 6, wherein the model-based cyclostationary noise suppression method is based on non-negative matrix factorization.

8. The method of claim 6, wherein the model-based cyclostationary noise suppression method is based on artificial neural networks.

9. The method of claim 6, wherein the model-based cyclostationary noise suppression method is based on Gaussian mixture models.

10. The method of claim 1, wherein the signal is modeled as a sum of a cyclostationary component and an event component.

11. The method of claim 1, wherein the segmenting further comprises:
estimating a start time and an end time of each cycle.

12. The method of claim 1, wherein the regions are analysed using a square root of Hann window.

13. The method of claim 1, wherein the features are derived from spectrograms.

14. The method of claim 1, wherein the classifier uses logistic regression.

15. The method of claim 1, wherein the classifier uses multiple instance logistic regression.

16. The method of claim 1, wherein, after the normalizing, the features are pooled for multiple cycles.

17. The method of claim 1, further comprising:
estimating a start time and an end time of each cycle, and wherein the estimating includes an offset to synchronize a start and an end time obtained from a timing signal with a start and end times of the cycle.

18. The method of claim 17, wherein the offset accounts for a difference in time required to acquire the timing signal and the acoustic signal.

19. A system for detecting events in a signal subject to cyclostationary background noise, wherein the signal is an acoustic signal, the system comprising:

a processor, coupled to a data storage memory unit, the processor configured to perform the steps of:

segmenting the signal into cycles;

determining within each cycle a sequence of regions, wherein a number of regions in the sequence is a fixed number for the cycles, and a placement within the cycle of each region in the sequence is a function of a length of the cycle;

deriving region features with a fixed dimension from each region within the sequence of regions for each cycle for the cycles;

deriving cycle features for each cycle by concatenating the region features for the regions within the sequence of regions for the cycle;

calculating an average of the cycle features over the cycles for obtaining an estimate of the cyclostationary background noise;

normalizing the cycle features for each cycle using the estimate of the cyclostationary background noise; and applying, after the normalizing, a classifier to the cycle features to detect the events, and using the detected events to tune a control unit of a machine, and using the detected events to tune a control unit of a machine.

* * * * *